United States Patent
Strauss et al.

(10) Patent No.: US 9,569,968 B2
(45) Date of Patent: Feb. 14, 2017

(54) METHOD AND DEVICE FOR THE AUTOMATED BRAKING AND STEERING OF A VEHICLE

(71) Applicant: Continental Teves AG & Co. oHG, Frankfurt (DE)

(72) Inventors: Matthias Strauss, Pfungstadt (DE); Juergen Pfeiffer, Glashuetten (DE); Stefan Lueke, Bad Homburg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/648,427

(22) PCT Filed: Dec. 18, 2013

(86) PCT No.: PCT/DE2013/200376
§ 371 (c)(1),
(2) Date: May 29, 2015

(87) PCT Pub. No.: WO2014/094772
PCT Pub. Date: Jun. 26, 2014

(65) Prior Publication Data
US 2015/0302751 A1    Oct. 22, 2015

(30) Foreign Application Priority Data

Dec. 20, 2012 (DE) .......... 10 2012 112 798
Dec. 20, 2012 (DE) .......... 10 2012 112 799
(Continued)

(51) Int. Cl.
*G08G 1/16* (2006.01)
*B60T 7/22* (2006.01)
(Continued)

(52) U.S. Cl.
CPC . *G08G 1/16* (2013.01); *B60T 7/22* (2013.01); *B60T 8/171* (2013.01); *B60T 8/17558* (2013.01);
(Continued)

(58) Field of Classification Search
CPC .. B60T 7/22; B60T 2201/022; B60T 2210/32; B60T 2260/024; G08G 1/16; B62D 15/0255; B62D 15/0265; B60W 10/184; B60W 10/20; B60W 30/09; B60W 2050/0091; B60W 2050/0094; B60W 2420/42; B60W 2420/52; B60W 2520/10; B60W 2550/10; B60W 2710/182
See application file for complete search history.

(56) References Cited

U.S. PATENT DOCUMENTS 5,332,057 A * 7/1994 Butsuen ............. B60K 31/0008
                                                    180/169
5,694,321 A   12/1997 Eckert et al.
(Continued)

FOREIGN PATENT DOCUMENTS

DE   100 12 737   9/2001
DE   100 60 498   10/2001
(Continued)

OTHER PUBLICATIONS

International Search Report of the International Searching Authority for International Application PCT/DE2013/200376, mailed Mar. 31, 2014, 3 pages, European Patent Office, HV Rijswijk, Netherlands.
(Continued)

*Primary Examiner* — Yuen Wong
(74) *Attorney, Agent, or Firm* — W. F. Fasse

(57) ABSTRACT

A method for the automated braking and/or steering of a vehicle uses at least one sensor system for detecting the vehicle's surroundings, a potential collision object in the
(Continued)

vehicle's surroundings, and a relative speed of the vehicle relative to the potential collision object. The activation and/or the sequence of an automated steering intervention and/or an automated braking intervention is determined based on the relative speed. The braking intervention is activated at first when the relative speed is below or equal to a predefined threshold, and the steering intervention is activated at first when the relative speed is above the predefined threshold.

21 Claims, 2 Drawing Sheets

(30) Foreign Application Priority Data

Apr. 10, 2013 (DE) .................. 10 2013 103 562
Apr. 11, 2013 (DE) .................. 10 2013 103 626

(51) Int. Cl.
| | |
|---|---|
| B60T 8/1755 | (2006.01) |
| B62D 15/02 | (2006.01) |
| B60W 10/184 | (2012.01) |
| B60W 10/20 | (2006.01) |
| B60W 30/09 | (2012.01) |
| B60T 8/171 | (2006.01) |
| B62D 6/00 | (2006.01) |
| B60W 50/00 | (2006.01) |

(52) U.S. Cl.
CPC ............ *B60W 10/184* (2013.01); *B60W 10/20* (2013.01); *B60W 30/09* (2013.01); *B62D 6/001* (2013.01); *B62D 15/0255* (2013.01); *B62D 15/0265* (2013.01); *B60T 2201/022* (2013.01); *B60T 2210/32* (2013.01); *B60T 2260/024* (2013.01); *B60W 2050/0091* (2013.01); *B60W 2050/0094* (2013.01); *B60W 2420/42* (2013.01); *B60W 2420/52* (2013.01); *B60W 2520/10* (2013.01); *B60W 2550/10* (2013.01); *B60W 2710/182* (2013.01); *B60W 2710/207* (2013.01)

(56) References Cited

U.S. PATENT DOCUMENTS

| | | | |
|---|---|---|---|
| 5,711,023 | A | 1/1998 | Eckert et al. |
| 6,017,101 | A | 1/2000 | Matsuda |
| 6,272,418 | B1 | 8/2001 | Shinmura et al. |
| 6,289,281 | B1 | 9/2001 | Shinmura et al. |
| 6,292,753 | B1 | 9/2001 | Sugimoto et al. |
| 6,567,748 | B2 | 5/2003 | Matsuno |
| 6,567,749 | B2 | 5/2003 | Matsuura |
| 6,820,007 | B2 | 11/2004 | Abe et al. |
| 6,926,374 | B2 | 8/2005 | Dudeck et al. |
| 6,959,970 | B2 | 11/2005 | Tseng |
| 6,962,396 | B2 | 11/2005 | Faye et al. |
| 6,968,920 | B2 | 11/2005 | Barton et al. |
| 7,015,805 | B2 | 3/2006 | Knoop et al. |
| 7,035,735 | B2 | 4/2006 | Knoop et al. |
| 7,213,687 | B2 | 5/2007 | Sakai et al. |
| 7,729,841 | B2 | 6/2010 | Knoop et al. |
| 7,734,418 | B2 | 6/2010 | Shoda et al. |
| 7,739,008 | B2 | 6/2010 | Cieler et al. |
| 7,778,753 | B2 | 8/2010 | Fujiwara et al. |
| 7,940,301 | B2 | 5/2011 | Kinoshita |
| 8,086,406 | B2 | 12/2011 | Ewerhart et al. |
| 8,126,626 | B2 | 2/2012 | Zagorski |
| 8,146,703 | B2 | 4/2012 | Baumann et al. |
| 8,255,121 | B2 | 8/2012 | Zagorski et al. |
| 8,392,062 | B2 | 3/2013 | Oechsle et al. |
| 8,423,277 | B2 | 4/2013 | Shirato |
| 8,452,506 | B2 | 5/2013 | Groult |
| 8,538,674 | B2 | 9/2013 | Breuer et al. |
| 9,174,641 | B2 | 11/2015 | Fritz et al. |
| 2001/0039472 | A1 | 11/2001 | Isogai et al. |
| 2004/0030497 | A1 | 2/2004 | Knoop et al. |
| 2004/0030498 | A1 | 2/2004 | Knoop et al. |
| 2004/0090117 | A1 | 5/2004 | Dudeck et al. |
| 2004/0158377 | A1 | 8/2004 | Matsumoto et al. |
| 2004/0193374 | A1 | 9/2004 | Hac et al. |
| 2005/0004738 | A1 | 1/2005 | Gronau et al. |
| 2005/0090955 | A1 | 4/2005 | Engelman et al. |
| 2005/0267683 | A1 | 12/2005 | Fujiwara et al. |
| 2006/0100766 | A1 | 5/2006 | Schwarz et al. |
| 2006/0163943 | A1 | 7/2006 | Von Holt et al. |
| 2006/0195231 | A1 | 8/2006 | Diebold et al. |
| 2007/0032952 | A1 | 2/2007 | Carlstedt et al. |
| 2007/0052530 | A1 | 3/2007 | Diebold et al. |
| 2007/0129891 | A1 | 6/2007 | Yano et al. |
| 2007/0294019 | A1 | 12/2007 | Nishira et al. |
| 2007/0299610 | A1 | 12/2007 | Ewerhart et al. |
| 2008/0046145 | A1 | 2/2008 | Weaver et al. |
| 2008/0208408 | A1 | 8/2008 | Arbitmann et al. |
| 2008/0319610 | A1 | 12/2008 | Oechsle et al. |
| 2009/0037055 | A1* | 2/2009 | Danner ............... B60R 21/0134 701/45 |
| 2009/0138201 | A1 | 5/2009 | Eckstein et al. |
| 2009/0212930 | A1 | 8/2009 | Pfeiffer et al. |
| 2009/0222166 | A1 | 9/2009 | Arbitmann et al. |
| 2009/0234543 | A1 | 9/2009 | Groitzsch et al. |
| 2010/0114490 | A1 | 5/2010 | Becker |
| 2010/0211235 | A1 | 8/2010 | Taguchi et al. |
| 2011/0015818 | A1* | 1/2011 | Breuer ............... B60T 8/17558 701/31.4 |
| 2011/0082623 | A1 | 4/2011 | Lu et al. |
| 2011/0190961 | A1 | 8/2011 | Giebel et al. |
| 2011/0196576 | A1 | 8/2011 | Staehlin |
| 2012/0065861 | A1 | 3/2012 | Hartmann et al. |
| 2014/0005875 | A1 | 1/2014 | Hartmann et al. |
| 2014/0074388 | A1 | 3/2014 | Bretzigheimer et al. |

FOREIGN PATENT DOCUMENTS

| | | |
|---|---|---|
| DE | 102 31 584 | 3/2003 |
| DE | 103 16 413 | 10/2004 |
| DE | 103 34 203 | 3/2005 |
| DE | 102005002760 | 8/2005 |
| DE | 102004060053 | 12/2005 |
| DE | 102005031854 | 2/2006 |
| DE | 102004047122 | 4/2006 |
| DE | 102004054720 | 5/2006 |
| DE | 102004056120 | 5/2006 |
| DE | 102004059002 | 6/2006 |
| DE | 102005003177 | 7/2006 |
| DE | 102005003274 | 7/2006 |
| DE | 102005035624 | 2/2007 |
| DE | 102005037479 | 2/2007 |
| DE | 102006036921 | 4/2007 |
| DE | 102005062275 | 6/2007 |
| DE | 102006047131 | 4/2008 |
| DE | 102006057744 | 7/2008 |
| DE | 602004011650 | 2/2009 |
| DE | 602005006269 | 5/2009 |
| DE | 102008003205 | 7/2009 |
| DE | 102008040241 | 1/2010 |
| DE | 102008056204 | 5/2010 |
| DE | 102009006747 | 8/2010 |
| DE | 102009020649 | 11/2010 |
| DE | 102011106808 | 1/2013 |
| EP | 1 418 104 | 5/2004 |
| EP | 1 600 321 | 11/2005 |
| EP | 1 977 946 | 10/2008 |

(56) References Cited

FOREIGN PATENT DOCUMENTS

| | | |
|---|---|---|
| JP | 2007-022232 A | 2/2007 |
| WO | WO 2004/103798 | 12/2004 |
| WO | WO 2006/045826 | 5/2006 |

OTHER PUBLICATIONS

English Translation of PCT International Preliminary Report on Patentability of the International Searching Authority for International Application PCT/DE2013/200376, mailed Mar. 13, 2015, 4 pages, International Bureau of WIPO, Geneva, Switzerland.
German Search Report for German Patent Application No. 10 2013 103 562.0, dated Nov. 28, 2013, 5 pages, Muenchen, Germany, with English translation, 5 pages.
German Search Report for German Patent Application No. 10 2013 103 626.0, dated Aug. 5, 2013, 5 pages, Muenchen, Germany, with English translation, 5 pages.

\* cited by examiner

METHOD AND DEVICE FOR THE AUTOMATED BRAKING AND STEERING OF A VEHICLE

FIELD OF THE INVENTION

The invention relates to a method and a device for automatically braking and/or steering a vehicle.

BACKGROUND INFORMATION

Driver assistance systems which support the driver in driving a vehicle, e.g. ACC, lane keeping systems, emergency braking and steering assistant, etc., have been implemented in production vehicles for some years. Responsibility for driving the vehicle continues to lie with the driver; he must be attentive at all times in order to drive the vehicle himself if required. Highly automated driving of a vehicle, i.e. the vehicle drives autonomously and the driver is allowed to direct his attention to other activities, is not yet common but possible according to the current state of the art. Here, automated braking and steering interventions are of great importance too.

An automated braking and/or steering intervention is initiated in both aforesaid system types in a critical surrounding situation, in particular in case of an impending collision.

SUMMARY OF THE INVENTION

An object of at least one embodiment of the present invention is to specify an improved method and device for the automated driving of a vehicle in a critical surrounding situation. A more particular object of at least one embodiment of the invention is to provide a method and a device for automatically braking and/or steering the vehicle.

The surroundings of a vehicle are monitored by at least one system for detecting the surroundings, e.g. a radar, LiDAR or camera sensor system, a radio-based system which receives information from other road users and, if appropriate, transmits information to other road users itself by radio, or a navigation system in conjunction with an electronic map. A critical surrounding situation is present, for example, when there is a risk of a collision with an object in the surroundings. Monitoring of the surroundings of the vehicle also serves to find out whether there is the opportunity to change lanes or enough space for another collision avoidance maneuver.

According to several embodiments of the invention, a method for the automated braking and/or steering of a vehicle is specified. For this purpose, the vehicle comprises at least one sensor system for detecting the vehicle's surroundings. The sequence of an automated steering and/or braking intervention—i.e. whether the first thing to be done is a braking intervention, optionally followed by a steering intervention, or vice versa—is determined based on a relative speed with respect to a collision object. The second intervention, e.g. a steering intervention following the braking intervention or a braking intervention following the steering intervention, is only performed if the collision risk continues to be present despite the first intervention.

In one preferred configuration or embodiment of the invention, only an automated steering intervention intended to avoid a collision and/or change lanes is initiated at first if the relative speed is above a predefined threshold. If a collision risk continues to be present, automated braking is performed next. In case of a high relative speed with respect to the collision object, it is assumed that it will not be possible to avoid the collision by braking alone. In particular, the controller can use the distance from the collision object and the width of the collision object to calculate a steering angle or steering moment which must be applied so that an ego-vehicle or subject vehicle can drive safely around the collision object. In this application, the ego-vehicle or subject vehicle is the vehicle equipped with a method or a device according to the invention claimed herein. As an alternative or additionally, a collision avoidance trajectory is calculated for the ego-vehicle in another configuration or embodiment of the invention. For this purpose, in particular, a sensor for detecting the surroundings detects the traffic lanes in the vicinity of the ego-vehicle and the calculated collision avoidance trajectory is used to actively steer the ego-vehicle to an adjacent lane without an obstacle. If no traffic lanes or no traffic lanes without obstacles are detected, the collision avoidance trajectory guides the ego-vehicle to another free space, preferably on the carriageway.

In another preferred configuration or embodiment of the invention, only an automated braking intervention is performed if the relative speed is below or equal to the predefined threshold. In this situation, it is initially assumed that a collision can be avoided by a braking intervention. If this should not be possible, e.g. because the braking force of the ego-vehicle is not sufficient or the relative speed is increased unexpectedly by the collision object or the position of the collision object changes, and a collision risk continues to be present during the automated braking intervention, an automated steering intervention intended to avoid a collision and/or change lanes is initiated. In particular, the controller can use the distance from the collision object and the width of the collision object to calculate a steering angle or steering moment which must be applied so that an ego-vehicle can drive safely around the collision object. As an alternative or additionally, a collision avoidance trajectory is calculated for the ego-vehicle in another configuration of the invention, as described above.

BRIEF DESCRIPTION OF THE DRAWINGS

In order that the invention may be clearly understood, it will now be explained in further detail in connection with example embodiments, with reference to the accompanying drawings, wherein.

DETAILED DESCRIPTION OF EXAMPLE EMBODIMENTS OF THE INVENTION

Figure 1:
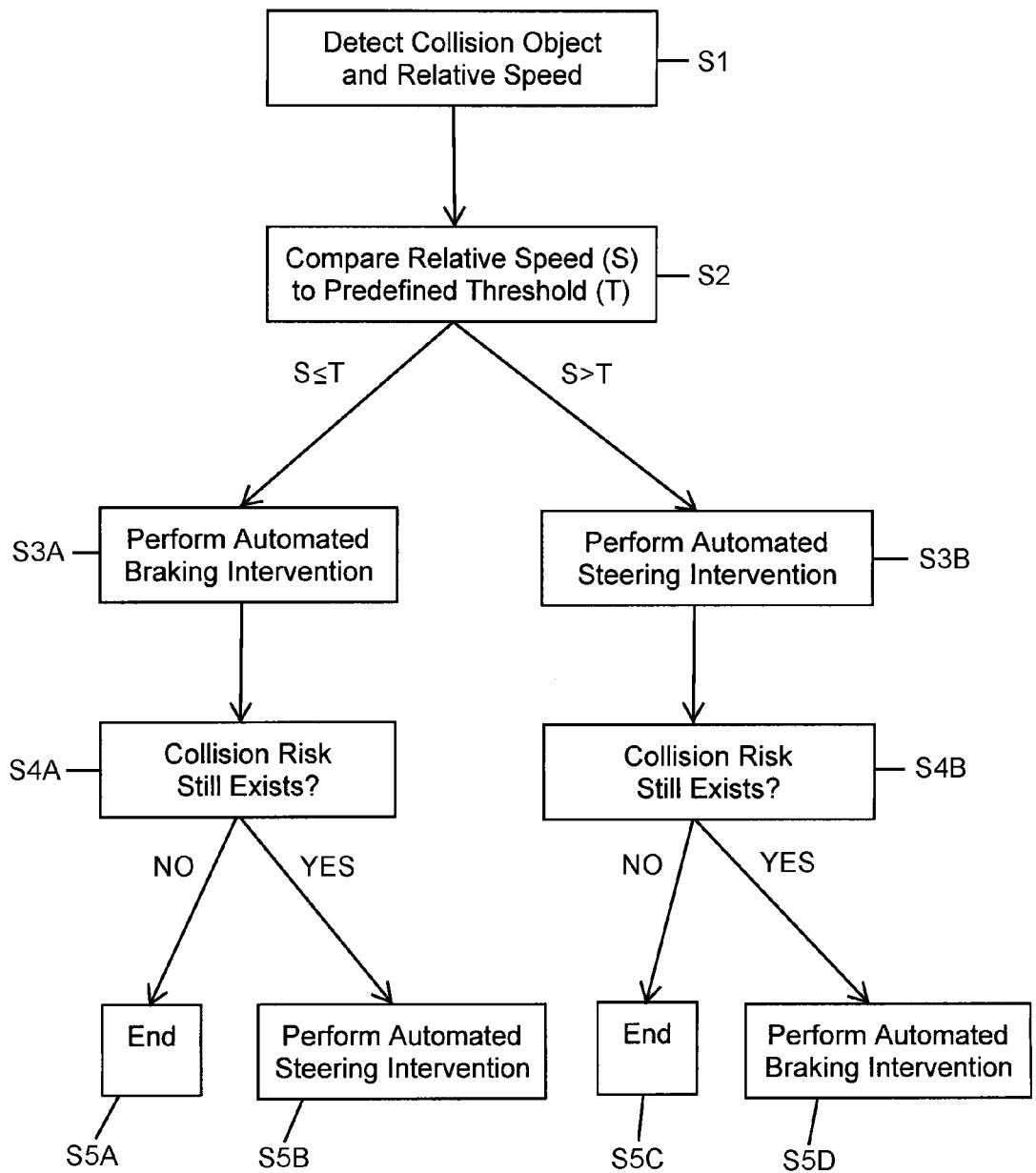
FIG. 1 is a schematic flow diagram of steps involved in an embodiment of the method according to the invention.

FIG. 1 depicts a flow diagram of steps involved in at least one method embodiment according to the invention. In a first step S1 a sensor system of a motor vehicle is used to detect a potential collision object and a relative speed of the vehicle relative to the object. A step S2 involves comparing the relative speed S to a predefined threshold T to determine whether the relative speed S is equal to or below the threshold T (i.e. $S \leq T$), or the relative speed S is above the threshold T (i.e. $S > T$). In the former case, when $S \leq T$, the method proceeds to step S3A of performing an automated braking intervention at first. On the other hand, in the latter case when $S > T$, the method proceeds to step S3B of performing an automated steering intervention at first. Generally, the relative speed S of the vehicle relative to the potential collision object is used as the basis to determine whether an automated steering intervention or an automated braking intervention shall be initiated at first. The initial automated braking intervention in step S3A or the initial automated steering intervention in step S3B can be the only intervention performed, e.g. when that intervention is sufficient to avoid a collision with the detected object. Alternatively, when a collision risk still exists (see step S4A or S4B) after the initial automated intervention (step S3A or S3B), then the other type of intervention can be performed thereafter (step S5B or S5D). Namely, when a collision risk still exists in the evaluation step S4A after the automated braking intervention in step S3A, then an automated steering intervention can be performed in step S5B, but when a collision risk does not still exist in the step S4A, then the method ends in step S5A. Alternatively, after the automated steering intervention has been performed at first in step S3B, when a collision risk still exists in step S4B then an automated braking intervention can be performed in step S5D, but when a collision risk does not still exist in step S4B, then the method ends in step S5C.

Preferably, the predefined threshold for the relative speed has a value between 40 and 60 km/h. In a special configuration of the invention, the threshold has a value between 45 and 55 km/h, in particular between 48 and 52 km/h. In an advantageous embodiment of the invention, the predefined threshold is 50 km/h.

In an advantageous configuration of the invention, the system for detecting the surroundings is designed such that a maximum relative speed of up to 60 to 70 km/h can be determined. This design is necessary to enable the reliable determination of relative speeds up to the predefined threshold.

In an advantageous configuration of the invention, the relative speed is either determined using the data detected by the at least one sensor system itself, as it is possible, for example, with a radar system, or the data detected by the at least one sensor system is used several times to determine distance values with respect to a potential collision object, which are then used to determine the relative speed with respect to the collision object. Known sensor systems for distance measurement are e.g. a stereo camera, a LiDAR, radar or ultrasonic sensor system. In addition, the data detected by the at least one sensor system is used to determine the width of the collision object. The width can e.g. be determined using distance information from a camera image. In addition, radar or LiDAR systems capable of angular resolution are known in the state of the art, which e.g. work according to the monopulse method. Moreover, scanning radar or LiDAR systems are known, which successively scan the vehicle's surroundings in different spatial directions. As an alternative or in addition to the aforesaid systems, a radar or LiDAR system capable of spatial resolution can include a plurality of sub-areas of detection each having at least one transmitter and receiver.

In a preferred configuration of the invention, data provided by at least two different sensor systems for detecting the surroundings is fused in order to detect collision objects. This approach increases the safety of the automated braking and/or steering intervention as an automated braking and/or steering intervention is only initiated if both sensor systems have recognized the collision object. In addition, the relevant parameters—distance, relative speed and width of the collision object—can be determined with more precision.

In an advantageous configuration of the invention, the data of a radar sensor system is therefore used to determine the distance and relative speed with respect to a potential collision object. A radar system can measure the relative speed directly. There is no time lag, which e.g. typically occurs if the relative speed is determined using a plurality of distance values detected one after the other. The data detected by a camera sensor system is used to determine the width and, in particular, the type of the collision object. Using the distance information, the width of an object can be determined relatively precisely if the imaging characteristics of the camera system are known. Another advantage of the camera sensor system is that the type of the object, e.g. car, motorcycle, truck, wall, etc., can be determined using the method of pattern recognition from a camera image.

In a special configuration of the invention, the intensity of the braking intervention or steering intervention is limited in accordance with a confidence of a signal provided by the sensor system for detecting the vehicle's surroundings and/or a confidence of the recognized objects. Confidence is, in particular, a measure of the certainty or reliability with which the surroundings of a vehicle have been recognized correctly. Faulty recognition can be due to a faulty function of the system for detecting the surroundings itself, caused e.g. by dirt or extreme environmental conditions (vibrations, cold, heat, strong variations in temperature), or to failure of a component of the system for detecting the surroundings.

In a preferred configuration of the invention, the intensity of the braking intervention or steering intervention is determined based on the time which has passed since a potential collision object has first been detected. In particular, if an object has only been detected for a short time which is below a predefinable threshold, the intensity of the braking intervention or steering intervention is limited to a maximum value. The intensity of the braking intervention is e.g. limited to a value between 2 and 4 m/s$^2$, e.g. 3 m/s$^2$, in this situation. In a positive configuration of the invention, confidence is determined based on signal variance, i.e. a measure of the extent to which the values differ from a mean value. In particular, the signal variance indicates, for example, whether a potential collision object can be seen in the input data continuously or only at intervals. The latter fact can be a sign of faulty detection. In particular, if e.g. a potential collision object is only detected at intervals, i.e. signal variance is high, the extent of deceleration is limited to a maximum value. The intensity of the braking intervention is, in particular, limited to a value between 2 and 4 m/s$^2$, e.g. 3 m/s$^2$, in this situation.

In another configuration of the invention, an upper threshold for the intensity of the braking intervention is determined in accordance with confidence. In a preferred configuration of the invention, the upper threshold for the intensity of the braking intervention is preferably selected to be low if the confidence values are low, i.e. the extent of deceleration is limited to low values below the threshold. If confidence is high, a high threshold is preferably selected to limit the intensity of the braking intervention.

In another configuration of the invention, the intensity of the braking intervention is adapted either continuously or stepwise if confidence increases over time. In particular, a non-limited deceleration or even immediate full application of the brakes is only initiated if signal quality increases and/or a predefined value of signal confidence is exceeded. The transition from limited deceleration to non-limited deceleration is preferably a linear or stepwise process.

Figure 2:
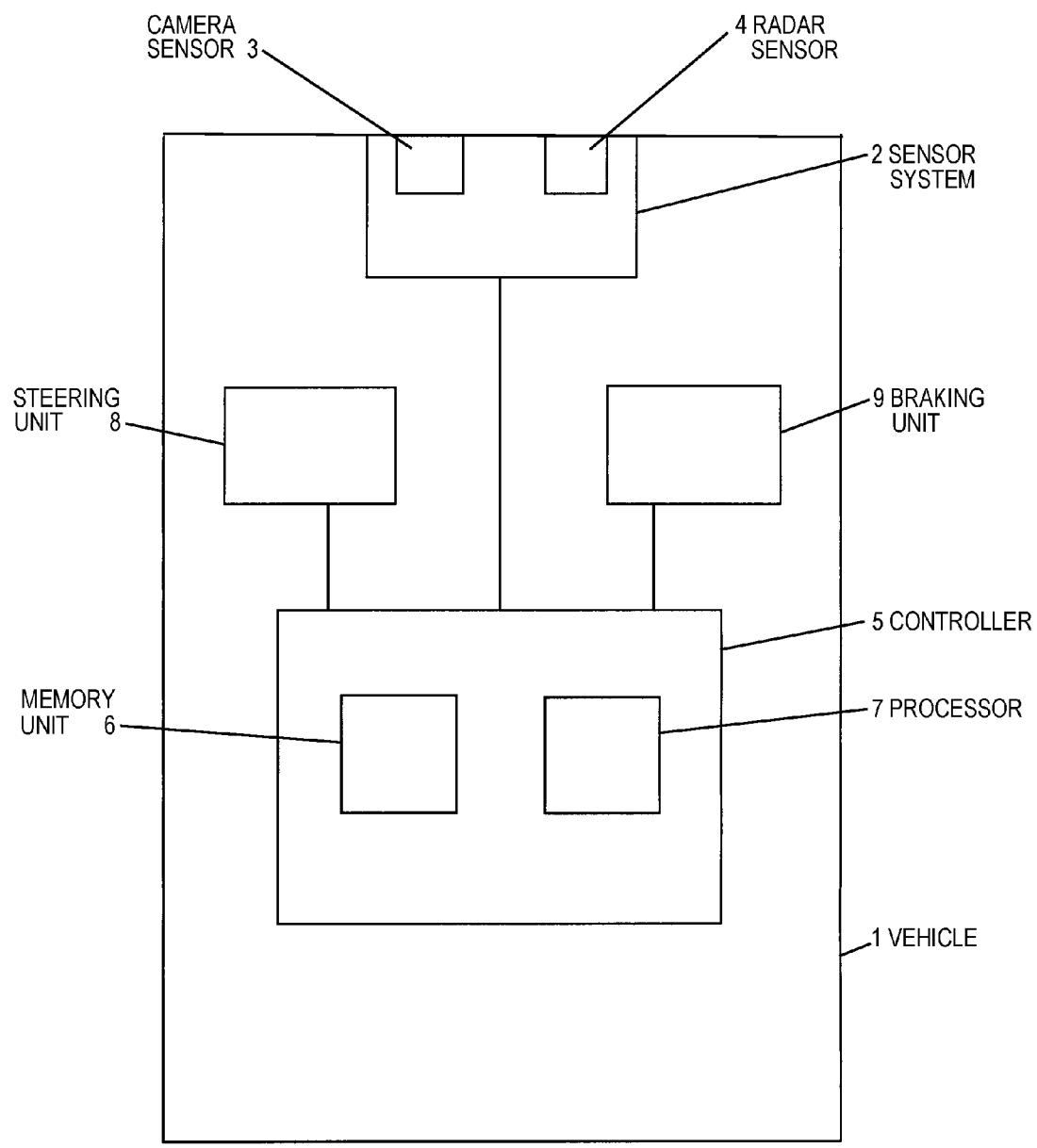
FIG. 2 is a schematic block diagram of a vehicle equipped with a sensor system, controller, steering unit and braking unit according to an apparatus embodiment of the invention.

As schematically shown in FIG. 2, another embodiment of the invention comprises a controller 5 for controlling an automated braking and steering intervention of a vehicle 1. The controller 5 comprises a memory unit 6 where a method as described above is stored and a processor unit 7, for carrying out a method as described above. The controller is connected to the at least one sensor system 2 of the vehicle 1 for detecting the surroundings. The sensor system 2 comprises a camera sensor 3 and/or a radar sensor 4. In addition, the controller 5 can be connected to a braking unit 9 for actuating the brakes and a steering unit 8 for actuating the steering system of the vehicle 1.

The invention claimed is:

1. A method of automated braking and automated steering of a vehicle to avoid or reduce a likelihood or a severity of a collision of the vehicle, comprising:
   with at least one sensor system, detecting vehicle surroundings of the vehicle and producing corresponding sensor data;
   with a controller of the vehicle, evaluating the sensor data and therefrom detecting a potential collision object in the vehicle surroundings, and determining a relative speed of the vehicle relative to the potential collision object;
   in the controller, comparing the relative speed to a predefined threshold; and
   with the controller, actuating a brake system of the vehicle to initiate an automated braking intervention at first when the relative speed is below or equal to the predefined threshold, and actuating a steering system of the vehicle to initiate an automated steering intervention at first when the relative speed is above the predefined threshold, in order to avoid or reduce the likelihood or the severity of the collision between the vehicke and the potential collision object.

2. The method according to claim 1, wherein the automated steering intervention was initiated at first because the relative speed was above the predefined threshold, and further comprising with the controller evaluating a collision risk of the collision between the vehicle and the potential collision object, and actuating the brake system to initiate an automated braking action when the collision risk continues to be present after the automated steering intervention was initiated at first.

3. The method according to claim 1, wherein the automated braking intervention was initiated at first because the relative speed was below or equal to the predefined threshold, and further comprising with the controller evaluating a collision risk of the collision between the vehicle and the potential collision object, and actuating the steering system to initiate an automated steering action when the collision risk continues to be present after the automated braking intervention was initiated at first.

4. The method according to claim 1, wherein the predefined threshold has a value between 40 and 60 km/h.

5. The method according to claim 1, wherein the predefined threshold has a value between 45 and 55 km/h.

6. The method according to claim 1, wherein the predefined threshold has a value between 48 and 52 km/h.

7. The method according to claim 1, wherein the predefined threshold is 50 km/h.

8. The method according to claim 1, further comprising with the controller determining a width of the potential collision object from the sensor data, and determining a collision avoidance trajectory for the vehicle based on at least the width of the potential collision object.

9. The method according to claim 1, wherein the at least one sensor system comprises at least two different sensors, and respective data from the different sensors are fused to produce fused data as the sensor data from which the potential collision object is detected.

10. The method according to claim 1, wherein the at least one sensor system comprises at least two sensor systems which include a radar sensor system and a camera sensor system, wherein first data detected by the radar sensor system is used in the controller to determine a distance from the vehicle to the potential collision object and the relative speed of the vehicle relative to the potential collision object, and wherein second data detected by the camera sensor system is used in the controller to determine a width and a kind of the potential collision object.

11. The method according to claim 1, further comprising, with the controller, determining a confidence value of the sensor data, and limiting a maximum intensity of the automated braking intervention or the automated steering intervention dependent on the confidence value.

12. The method according to claim 1, wherein the automated braking intervention is initiated at first based and dependent only on the relative speed being below or equal to the predefined threshold, and the automated steering intervention is initiated at first based and dependent only on the relative speed being above the predefined threshold.

13. An apparatus for automated braking and automated steering of a vehicle to avoid or reduce a likelihood or a severity of a collision of the vehicle, comprising:
   a controller,
   wherein the controller is configured to be connected to at least one sensor system of the vehicle for detecting vehicle surroundings of the vehicle, and to a braking system and a steering system of the vehicle, and
   wherein the controller comprises:
      a memory that stores a program; and
      a processor configured to execute the program which performs a method comprising:
         from the at least one sensor system, receiving sensor data representing the vehicle surroundings;
         evaluating the sensor data and therefrom detecting a potential collision object in the vehicle surroundings, and determining a relative speed of the vehicle relative to the potential collision object;
         comparing the relative speed to a predefined threshold; and
         actuating the braking system of the vehicle to initiate an automated braking intervention at first when the relative speed is below or equal to the predefined threshold, and actuating the steering system of the vehicle to initiate an automated steering intervention at first when the relative speed is above the predefined threshold, in order to avoid or reduce the likelihood or the severity of the collision between the vehicle and the potential collision object.

14. The apparatus according to claim 13, further comprising the at least one sensor system, a braking control unit of the braking system, and a steering control unit of the steering system, wherein the at least one sensor system is configured and adapted such that the relative speed of up to 70 km/h is determined.

15. A method of automatically controlling braking or steering of a vehicle to avoid or reduce a likelihood or a severity of a collision of the vehicle, comprising:
   with at least one sensor system of the vehicle, detecting surroundings of the vehicle and producing sensor data;

in a controller of the vehicle, evaluating the sensor data to detect a potential collision object and to determine a relative speed of the vehicle relative to the potential collision object;

in the controller, comparing the relative speed to a predefined threshold, and determining that an automated braking intervention shall be initiated at first when the relative speed is below or equal to the predefined threshold and that an automated steering intervention shall be initiated at first when the relative speed is above the predefined threshold; and with a braking or steering control unit of the vehicle, in response to and dependent on a result of the determining, either actuating a braking system of the vehicle to initiate the automated braking intervention to automatically brake the vehicle at first or actuating a steering system of the vehicle to initiate the automated steering intervention to automatically steer the vehicle at first, in order to avoid or reduce the likelihood or the severity of the collision between the vehicle and the potential collision object.

16. The method according to claim 15, wherein the comparing determines that the relative speed is below or equal to the predefined threshold, and wherein only the automated braking intervention and not the automated steering intervention is performed.

17. The method according to claim 15, wherein the comparing determines that the relative speed is below or equal to the predefined threshold, wherein the automated braking intervention is initiated at first, and then additionally comprising determining whether a collision risk of the collision between the vehicle and the potential collision object still exists after the automated braking intervention was initiated at first, and initiating an automatic steering of the vehicle when the controller determines that the collision risk still exists.

18. The method according to claim 15, wherein the comparing determines that the relative speed is above the predefined threshold, and wherein only the automated steering intervention and not the automated braking intervention is performed.

19. The method according to claim 15, wherein the comparing determines that the relative speed is above the predefined threshold, wherein the automated steering intervention is initiated at first, and then additionally comprising determining whether a collision risk of the collision between the vehicle and the potential collision object still exists after the automated steering intervention was initiated at first, and initiating an automatic braking of the vehicle when the controller determines that the collision risk still exists.

20. The method according to claim 15, further comprising evaluating the sensor data to determine a collision risk of the collision between the vehicle and the potential collision object, and wherein the automated braking intervention or the automated steering intervention is performed further in response to and dependent on the collision risk.

21. The method according to claim 15, wherein the determining that the automated braking intervention shall be initiated at first is based and dependent only on the relative speed being below or equal to the predefined threshold, and the determining that the automated steering intervention shall be initiated at first is based and dependent only on the relative speed being above the predefined threshold.

* * * * *